United States Patent [19]
Coolidge

[11] Patent Number: 5,197,190
[45] Date of Patent: Mar. 30, 1993

[54] FABRICATION OF REPAIR METHOD FOR AN INTEGRALLY BLADED ROTOR

[75] Inventor: Kenneth D. Coolidge, Hobe Sound, Fla.

[73] Assignee: United Technologies Corporation, Hartford, Conn.

[21] Appl. No.: 664,149

[22] Filed: Mar. 4, 1991

[51] Int. Cl.⁵ .............................................. B21K 3/04
[52] U.S. Cl. ................................ 29/889.1; 29/889.21; 29/889.23; 29/402.08; 228/119
[58] Field of Search ............ 29/889.1, 889.21, 889.22, 29/889.23, 402.08, 426.4, 428; 228/119

[56] References Cited

U.S. PATENT DOCUMENTS

| | | | |
|---|---|---|---|
| 3,314,137 | 4/1967 | Schellens | 29/113 |
| 3,590,454 | 7/1971 | Brass | 29/889.21 |
| 3,873,234 | 3/1975 | Perry | 29/889.21 |
| 4,702,673 | 10/1987 | Hansen et al. | 29/889.21 |
| 4,873,751 | 10/1989 | Walker et al. | 29/889.1 |
| 4,883,216 | 11/1989 | Patsfall | 29/889.1 |

Primary Examiner—Irene Cuda
Attorney, Agent, or Firm—Edward L. Kochey, Jr.

[57] ABSTRACT

A blade is formed from solid stock, leaving a box of material around the block. Instead of removing the box at this time, the entire box is bonded to a blade stub. The box facilitates handling and energy transfer for the bonding operation. Thereafter the box is removed from the bonded blade.

8 Claims, 6 Drawing Sheets

FABRICATION OF REPAIR METHOD FOR AN INTEGRALLY BLADED ROTOR

DESCRIPTION

1. Technical Field

The invention relates to integrally bladed rotors and in particular to a method for bonding blades thereto.

2. Background of Invention

In large gas turbine engines, both the compressor section and a turbine section are of axial flow design, and each stage comprises a disk having a plurality of airfoils mounted on its rim. These blade and disk assemblies have been produced from separate components with the disk having the blades mechanically attached. This is advantageous since it permits blades to be readily replaced, but adds substantially to the weight of the assembly and it is difficult to achieve the high strength required for high speed modern gas turbine engines.

Integrally bladed rotors have been therefore developed where the blades are an integral part of the rotor. These blades are either formed integrally with the disk or are metallurgically bonded to the disk.

One technique for fabricating airfoil blades is shown in U.S. Pat. No. 3,314,137. The process starts with a bar of stock material. The blade form is cavitated or otherwise machined within a block of the stock material leaving a box of stock material secured to and surrounding the blade. Thereafter, the root and platform of the blade are machined and the box removed. The blade with the root form is intended for dovetail insertion into a rotor.

U.S. Pat. No. 4,873,751 shows a method of forming a integrally bladed rotor with individual blades bonded to blade stubs on the rotor. The complex blade shapes must be grasped by a holding tool. Axial force is then applied while heating the interface between the blade and the stub. A collar around the blade is sometimes used to accept the bonding force.

SUMMARY OF THE INVENTION

A rotor disk is formed and a plurality of blade stubs around the periphery are formed thereon. A blade is formed within a solid stock of blade material leaving a box of stock material surrounding the blade. This box has a root portion, two side portions and a tip portion. With the blade still integral with the surrounding box, the box is bonded to one of the blade stubs by applying force through the box and simultaneously heating the interface by friction-welding, induction heating, or resistance heating. Thereafter, the box is separated from the blade leaving the blade and a portion of the root portion of the box. The blade is thereafter finish machined.

DESCRIPTION OF THE PREFERRED EMBODIMENT

Figure 1:
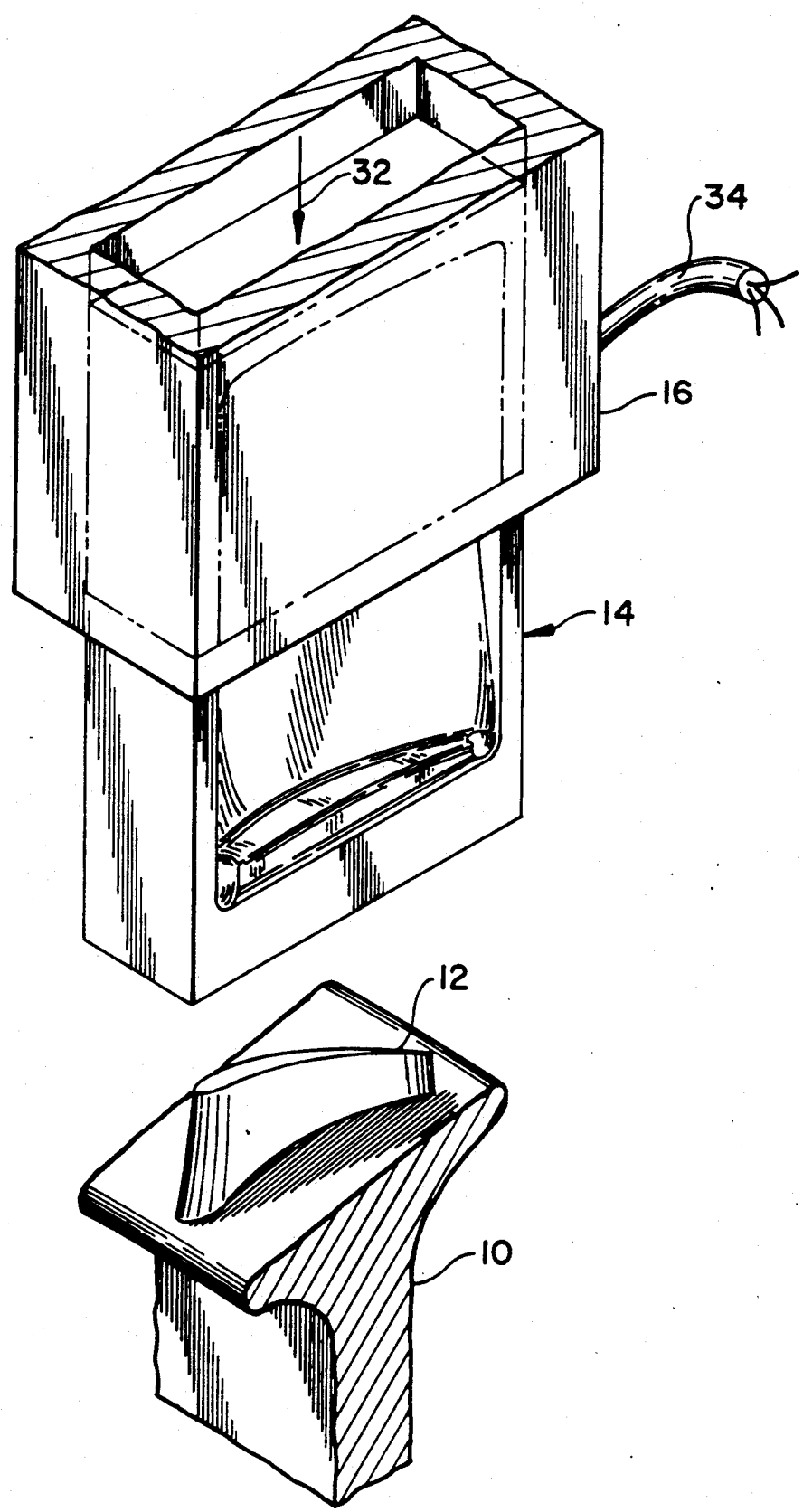
FIG. 1 is an isometric view of a portion of the rotor with a box blade and a holding tool.

A compressor or turbine rotor disk 10 is formed in a conventional manner with a plurality of blade stubs 12 around the periphery thereof. These blade stubs may be machined from the rotor forging or forged into the original structure as desired.

Box blade 14 is secured within tool holder 16 with a box blade 14 being aligned with stub 12.

Figure 2:
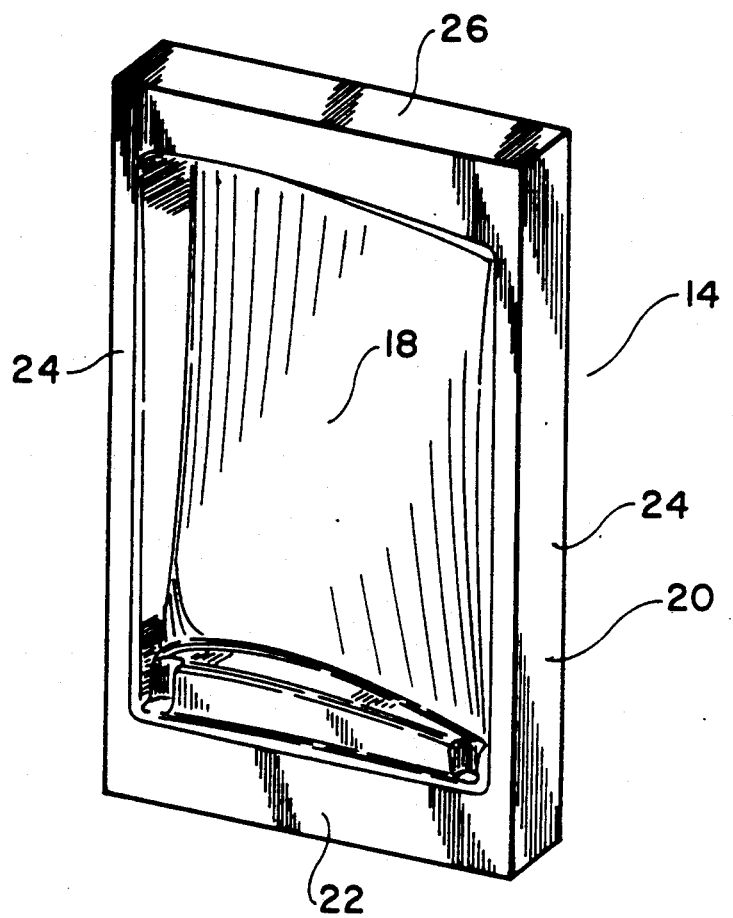
FIG. 2 is a view of the box blade.

FIG. 2 shows box blade 14 which has been formed from solid bar stock with an airfoil blade 18 formed within box 20. A blade form may be manufactured by cavitation, electrochemical machining or any other desired method. The box 20 remains integral with the blade form 18 and has a root portion 22, two side portions 24 and a top portion 26.

Figure 3:
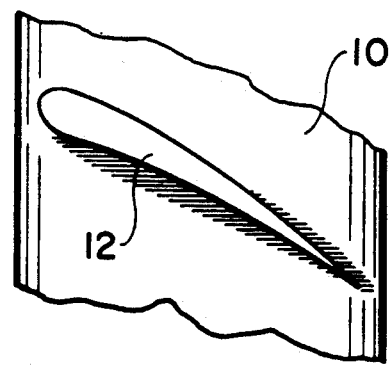
FIG. 3 is a section showing the blade stub and disk.
Figure 4:
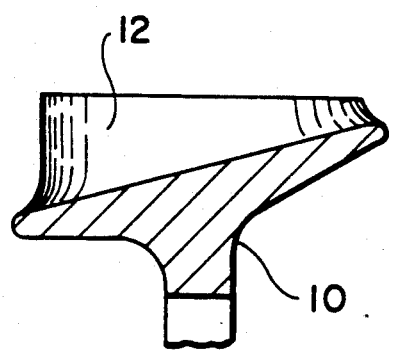
FIG. 4 is a top view showing the blade stub.

FIGS. 3 and 4 illustrate the blade stub 12 to which the box blade is to be secured.

Figure 5:
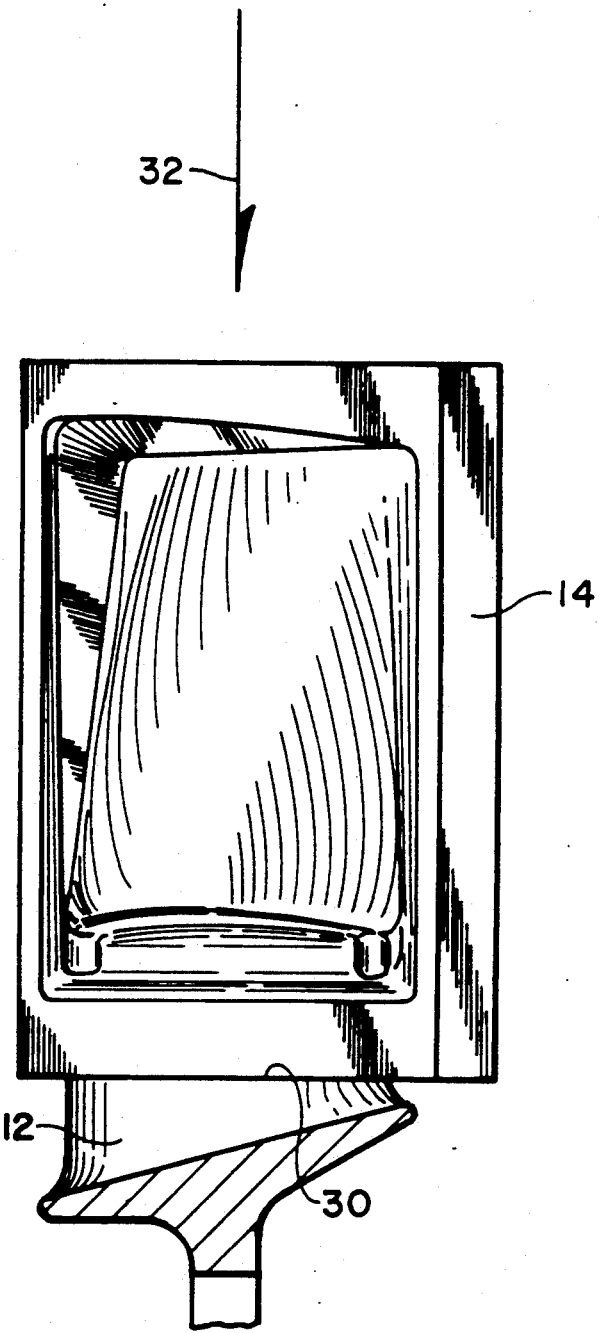
FIG. 5 is side view of box blade ready for bonding without tooling.

FIG. 5. The box blade 14 is shown in contact with blade stub 12 at interface 30. Blade 14 is secured within blade holder 16 whereby an axial force 32 may be applied, and for resistance bonding electric power is supplied through cable 34.

Axial force through the blade is substantially distributed in proportion to the cross-sectional metal area, and accordingly the majority of the force passes through the box structure rather than the blade. Even the force passing through the blade is not likely to buckle the blade since the blade is still integral with the box structure and thereby reinforced against buckling.

As illustrated, resistance heating of the interface is used. Alternately, induction coils around junction 30 may be used to locally heat the joint with the force being applied through the tool holder. Another method of bonding would be to friction-weld by repeated rubbing at the interface 30.

The box offers a more easily grasped structure for the tool holder as compared to the conventional individual blade where the convoluted shape must be grasped. It also facilitates automation because of the simplicity and uniformity of the structure to be grasped. Furthermore it substantially reinforces the blade against any forces being applied to it during any friction-welding or other bonding of the structure.

Figure 6:
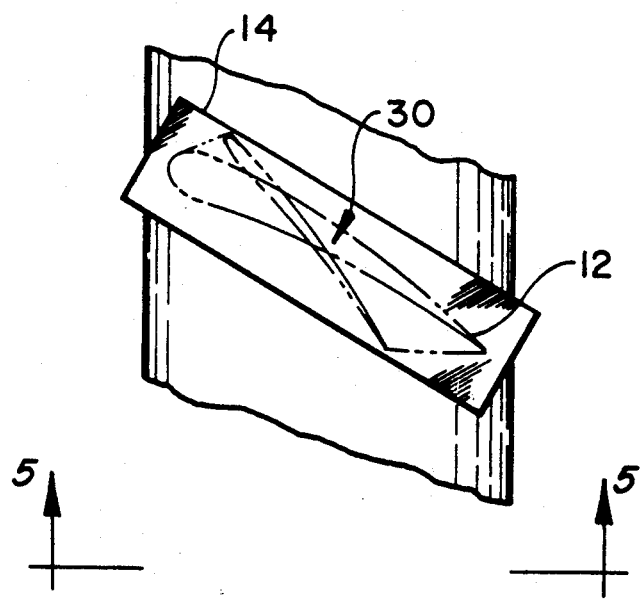
FIG. 6 is a top view of a box blade ready for bonding without tooling.

FIG. 6 is a top view with box blade 14 located over the interface portion 30 of stub 12. This illustrates the use of the box blade even though the blade form is substantially skewed from the axial direction of the disk.

Figure 7:
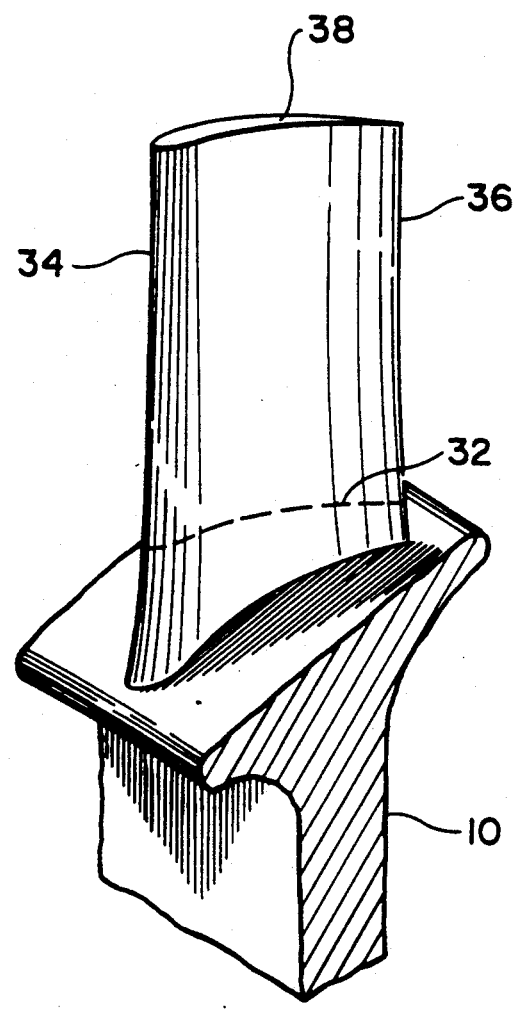
FIG. 7 is a view of the blade as finish machined.

After the bonding, the top portion 26 and the side portions 24 of the box blade are machined away. Also a portion of the root portion 22 of the box is machined away leaving a net shaped blade with the bonded area 32 being shown in FIG. 7. The leading edge 34 and the trailing edge 36 along with tip 38 are then machined to the final form.

The same process may be used to repair a damaged blade. In this case the damaged blade is removed leaving a blade stub 12. The remainder of the procedure is identical to that described with respect to the fabrication of an integrally bladed rotor.

I claim:

1. A method of bonding an airfoil blade to a rotor comprising:
    forming a rotor disk;
    forming a plurality of blade stubs around the periphery of said disk;

forming a blade within a solid stock of blade material, leaving a box of stock material surrounding said blade, said box having a root portion, two side portion and a tip portion;

bonding said root portion of said box to one of said blade stubs;

thereafter separating said box, except for a bonded section of said root portion of said box, from said blade; and final machining said blade.

2. A method as in claim 1 comprising also:

securing a power cable to said box of stock material; and said bonding of said root portion of said box to one of said blade stubs comprising: resistance heating of the box and stub interface by applying power through said cable while simultaneously applying compressive force to said box structure.

3. A method as in claim 1 comprising also: clasping said box structure with a tool holder and applying compressive force on the joint between said box structure and said blade stub, by applying force through said box structure while heating the interface between said blade stub and said root portion of said box.

4. A method as in claim 3 comprising also:

securing a power cable to said tool holder; and resistance heating of the box and stub interface by applying power through said cable while simultaneously applying compressive force to said box structure.

5. A method of repairing a damaged blade on an integrally bladed rotor comprising:

removing said damaged blade leaving a blade stub;

forming a blade within a solid stock of blade material, leaving a box of stock material surrounding said blade, said box having a root portion, two side portions and a tip portion;

bonding said root portion of said box to said blade stub;

thereafter separating said box, except for a bonded section of said root portion of said box, from said blade; and final machining said blade.

6. A method as in claim 5 comprising also:

securing a power cable to said box of stock material; and said bonding of said root portion of said box to one of said blade stubs comprising: resistance heating of the box and stub interface by applying power through said cable while simultaneously applying compressive force to said box structure.

7. A method as in claim 6 comprising also:

clasping said box structure with a tool holder and applying compressive force on the joint between said box structure and said blade stub by applying force through said box structure while heating the interface between said blade stub and said root portion of said box.

8. A method as in claim 7 comprising also:

securing a power cable to said tool holder; and resistance heating of the box and stub interface by applying power through said cable while simultaneously applying compressive force to said box structure.

* * * * *